United States Patent
Tarabulski et al.

[19]

[11] Patent Number: 5,809,775

[45] Date of Patent: Sep. 22, 1998

[54] REDUCING $NO_x$ EMISSIONS FROM AN ENGINE BY SELECTIVE CATALYTIC REDUCTION UTILIZING SOLID REAGENTS

[75] Inventors: Theodore J. Tarabulski, Brewster, N.Y.; Jeremy D. Peter-Hoblyn, Cornwall, United Kingdom; James M. Valentine, Fairfield, Conn.

[73] Assignee: Clean Diesel Technologies, Inc., Stamford, Conn.

[21] Appl. No.: 831,210

[22] Filed: Apr. 2, 1997

[51] Int. Cl.⁶ ............................. C01B 21/00; F01N 3/20
[52] U.S. Cl. ............................. 60/274; 60/286; 423/212; 423/235
[58] Field of Search .............. 60/274, 286, 303; 423/212, 213.7, 235, 239.1

[56] References Cited

U.S. PATENT DOCUMENTS

| | | | |
|---|---|---|---|
| 4,188,364 | 2/1980 | Gladden | 423/213.7 X |
| 4,268,488 | 5/1981 | Ginger | 23/239.1 |
| 4,403,473 | 9/1983 | Gladden | 60/274 |
| 4,854,123 | 8/1989 | Inoue | 60/274 |
| 4,891,050 | 1/1990 | Bowers et al. | 44/67 |
| 4,892,562 | 1/1990 | Bowers et al. | 44/67 |
| 5,034,020 | 7/1991 | Epperly et al. | 44/358 |
| 5,215,652 | 6/1993 | Epperly et al. | 208/140 |
| 5,224,346 | 7/1993 | Berriman et al. | 60/274 |
| 5,240,688 | 8/1993 | Von Harpe et al. | 423/235 |
| 5,266,083 | 11/1993 | Peter-Hoblyn et al. | 44/358 |
| 5,431,893 | 7/1995 | Hug et al. | 423/234.1 |
| 5,540,047 | 7/1996 | Dahlheim et al. | 60/274 |
| 5,693,300 | 12/1997 | Slone | 423/235 |

FOREIGN PATENT DOCUMENTS

| | | |
|---|---|---|
| 0 487 886 | 6/1992 | European Pat. Off. . |
| 0 615 777 | 2/1994 | European Pat. Off. . |
| 90/07561 | 7/1990 | WIPO . |
| 97/01387 | 1/1997 | WIPO . |

*Primary Examiner*—Tony M. Argenbright
*Attorney, Agent, or Firm*—St. Onge Steward Johnston & Reens LLC

[57] ABSTRACT

Urea or other solid $NO_x$-reducing reagent is employed in a selective catalytic reduction process on emissions from diesel and lean-burn gasoline engines. The solid reagent is fed to a gas generator that produces a reactant gas by heating. In one embodiment the reactant gas is maintained at elevated temperatures to prevent condensation products from forming. The reactant gas contains ammonia and is fed to the exhaust on an as-needed basis.

16 Claims, 3 Drawing Sheets

REDUCING NO$_x$ EMISSIONS FROM AN ENGINE BY SELECTIVE CATALYTIC REDUCTION UTILIZING SOLID REAGENTS

TECHNICAL FIELD

The invention relates to means and methods that enable the safe and reliable reduction of nitrogen oxides (NO$_x$) emissions while permitting a diesel or other lean-burn engine to operate efficiently.

Diesel and lean-burn gasoline engines provide advantages in fuel economy, but produce both NO$_x$ and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase NO$_x$.

Current and proposed regulations challenge manufacturers to achieve good fuel economy and reduce particulates and NO$_x$. Lean-burn engines will be necessary to achieve the fuel economy objective, but the high concentrations of oxygen in the exhaust renders typical exhaust gas catalyst systems ineffective for reducing NO$_x$.

SCR (selective catalytic reduction) has been available for years in some contexts for reducing NO$_x$. To date, however, SCR has depended on the use of ammonia, which has safety problems associated with its storage and transport. Urea is and other solid reagents are safer, but have not been practical for many SCR applications—particularly mobile NO$_x$ sources—due to the difficulty in converting them from solid or solution form to active gaseous species, typically NH$_i$ and HNCO radicals.

There is a current need for a safe, economical and effective answer to the problems associated with SCR, particularly for mobile diesel and other lean-burn engines.

BACKGROUND ART

Where SCR catalysts are employed to limit NO$_x$ emissions from diesel engines, one has to deal with either the dangers of ammonia or a risk of fouling the catalysts under most conditions. In this regard, see R. J. Hulterman; A Selective Catalytic Reduction Of NO$_x$ from Diesel Engines Using Injection Of Urea; Ph.D. thesis, September 1995. Hulterman describes a number of technical challenges including clogging of atomizers, decomposition problems and system dynamics.

The limited attempts to use urea SCR for diesel engines have required the use of large pyrolization chambers or other devices following the point of urea introduction into the exhaust, as disclosed in U.S. Pat. No. 5,431,893, to Hug, et al. Equipment of this type highlights the known problems with urea.

Regardless of physical form, urea takes time to break down in hot exhaust gases and may cause nozzle plugging. To protect an SCR catalyst from fouling, Hug, et al., propose bulky equipment. In addition, this disclosure highlights the necessity of maintaining the urea solution at a temperature below 100° C. to prevent hydrolysis. They propose the use of moderate urea pressures when feeding the urea and find it necessary to have alternative means to introduce high-pressure air into the feed line when it becomes plugged. The nozzles employed by Hug, et al., are apparently capable of producing moderately-fine sprays, the dispersion of which is aided by auxiliary air, but the droplets are still large enough to require a large pyrolization channel. Moreover, they employ dilute solutions that require significant heating to simply evaporate the water. See also, WO 97/01387 and European Patent Specification 487,886 A1.

In European Patent Specification 615,777 A1, there is described an apparatus that feeds solid urea into a channel containing exhaust gases, which are said to be hydrolyzed in the presence of a catalyst. For successful operation the disclosure indicates that it is necessary to employ a hydrolysis catalyst, compressed air for dispersion of fine solids, means for grinding the urea into fine solids and a coating to prevent urea prills form sticking together. The disclosure notes that if the inside of the catalyzer and the nozzle tip only were coated with the catalyst, corrosion and deposition occurred. Despite achieving the goal of removing water from the process, the specification introduces solid urea into the gas stream—possibly depositing urea on the SCR catalyst.

Each of the points of caution by these references about the difficulties of using urea with SCR systems, especially for mobile sources, illustrates the trouble and lack of practical success the art has had and continues to have.

The art is awaiting the development of a process and apparatus that would permit the use of urea or other solid reagent in an SCR process simply, reliably, economically and safely.

DISCLOSURE OF INVENTION

It is an object of the invention to provide a safe, reliable SCR system for reducing NO$_x$ emissions from an internal combustion engine.

It is another object of the invention to eliminate the safety problems associated with the storage and handling of ammonia for mobile uses.

It is another object of the invention to eliminate the problem of reagent freezing associated with aqueous urea for mobile applications.

It is another object of the invention to provide a simple, robust, SCR system capable of rapid response for effectively and reliably reducing NO$_x$ emissions from internal combustion engines, especially in mobile applications.

It is another object of the invention to enable a use of urea or other solid reagent for SCR that avoids wetting of or solids deposition on the catalyst.

It is a yet further and more specific object of the invention to enable the use of solid urea or other solid reagent in an SCR system.

It is a yet further and more specific object of the invention to enable the use of solid urea or other solid reagent in an SCR system, thus reducing the weight of reagent carried.

It is a yet further and more specific object of the invention to enable the use of solid urea or other solid reagent in an SCR system, thus reducing the energy required to gasify the urea by eliminating the need to vaporize water.

It is a yet further and more specific object of the invention to enable the use of urea or other reagent in solid form in an SCR system, thereby better maintaining the temperature of the exhaust by eliminating the need to use exhaust heat to vaporize water present in the reagent.

It is a yet further and more specific object of the invention to enable the use of urea or other solid reagent in an SCR system that enables integration with an engine management system (EMS), thereby avoiding the need for an extra controller.

It is yet another specific object of the invention to provide a simple mechanical device for accomplishing the above objects and preferably to enable close coupling of the reagent injection means and the SCR catalyst.

These and other objects are achieved by the present invention, which provides an improved process and apparatus for $NO_x$ reduction. The process, in one of its aspects, comprises: supplying solid $NO_x$-reducing reagent capable of generating ammonia gas upon heating, into a vessel having an outlet; heating the solid $NO_x$-reducing reagent in the vessel at a temperature above the pyrolysis temperature for the reagent, to produce a reactant gas containing ammonia; introducing the reactant gas into the exhaust gas at an exhaust gas temperature effective for selective catalytic reduction, and passing the exhaust gas containing the reactant gas through an SCR reactor.

Preferably, the temperature of the exhaust gases is within the range of from about 180° to about 650° C. Urea is a preferred solid $NO_x$-reducing reagent, but the reagent can comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine; tricyanourea; amines and their salts (especially their carbonates), including guanidine, guanidine carbonate, methyl amine carbonate, ethyl amine carbonate, dimethyl amine carbonate, hexamethylaminetetramine and hexamethylaminetetramine carbonate.

Each of the above $NO_x$-reducing reagents, or combination of them, will have a preferred temperature for pyrolysis. Some like ammonium carbonate, ammonium bicarbonate, and ammonium carbamate, are converted easily with relatively mild heating, e.g., as low as 40° C. The conversion of these materials is quantitative to ammonia gas and carbon dioxide. Others of the $NO_x$-reducing reagents are "urea-related materials" (ammelide, ammeline, ammonium cyanate, biuret, cyanuric acid, isocyanic acid, melamine, tricyanourea, urea, and mixtures of any number of these) and do not decompose easily and yield HNCO in addition to ammonia as active reagent gases. Yet others, do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylaminetetramine and hexamethylaminetetramine carbonate. Amines with higher alkyls can be employed to the extent that the hydrocarbon components released do not interfere with the $NO_x$-reduction reaction.

For the group of urea and other urea-related materials, it is preferred that the solid $NO_x$-reducing reagent be heated to a temperature of at least about 300° C., e.g., at least about 400° C., and is maintained at a temperature at least about as high until introduced into the exhaust gas. Positive pressure or vacuum can be applied during heating the $NO_x$-reducing reagent. Conveniently, the reagent is maintained under a pressure of at least about 50 psi during heating to assist with injection of the reactant gas.

In one aspect, the apparatus of the invention for reducing the emissions of $NO_x$ from a lean-burn engine having associated therewith an exhaust system having an exhaust passage leading to an SCR reactor effective for selective catalytic $NO_x$ reduction, comprises: means for supplying solid $NO_x$-reducing reagent to a vessel having an outlet; means for heating the solid $NO_x$-reducing reagent in the vessel at a temperature above the pyrolysis temperature for the reagent, to produce a reactant gas containing ammonia; means for introducing the reactant gas into the exhaust gas at an exhaust gas temperature effective for selective catalytic reduction; and means for passing the exhaust gas containing the reactant gas through an SCR reactor.

A preferred form of apparatus will include: means for maintaining the solid $NO_x$-reducing reagent under pressure while it is being supplied to the vessel; and means for maintaining the gas containing ammonia under pressure in the vessel. For reactant gases produced from urea and other urea-related materials, means are preferably provided to maintain the temperature of the reactant gases sufficiently high to prevent condensation products from forming.

In another preferred form, the apparatus will further include: means to sense the temperature within the exhaust gas; means to generate a signal representative of the sensed temperature; means to sense the pressure of ammonia gas; means to generate a signal representative of the sensed pressure; and means to compare the generated signals to reference values and generate a control signal for controlling solid $NO_x$-reducing reagent feed to the means for heating the solid $NO_x$-reducing reagent and the feed of reactant gas to the exhaust gases.

BRIEF DESCRIPTION OF THE DRAWINGS

The invention will be better understood and its advantages more apparent from the following detailed description, especially when read in light of the accompanying drawings, wherein.

DETAILED DESCRIPTION OF A PREFERRED EMBODIMENT

In this description, the term "lean-burn engine" is meant to include engines that can be operated with an inlet oxygen concentration greater than the amount required for stoichiometric (or chemically correct) combustion of a hydrocarbon fuel, e.g., at least 1% by weight excess oxygen. The term "engine" is meant in the broad sense to include all combustors which combust fuel to provide heat, e.g., for direct or indirect conversion to mechanical or electrical energy. Internal combustion engines of the Otto, Diesel and turbine types, as well as burners and furnaces, are included and can benefit from the invention. However, since the problems and advantages of successful achievement of reliable $NO_x$ reduction on diesel engines are so pronounced, the diesel engine is used throughout this description for purposes of example. Stationary and mobile engines are contemplated.

The term "Diesel engine" is meant to include all compression-ignition engines, for both mobile (including marine) and stationary power plants and of the two-stroke per cycle, four-stroke per cycle and rotary types.

The term "hydrocarbon fuel" is meant to include all of those fuels prepared from "distillate fuels" or "petroleum". Gasoline, jet fuel, diesel fuel, and various other distillate fuels are included. The term "distillate fuel" means all of those products prepared by the distillation of petroleum or petroleum fractions and residues. The term "petroleum" is meant in its usual sense to include all of those materials regardless of source normally included within the meaning of the term, including hydrocarbon materials, regardless of viscosity, that are recovered from fossil fuels.

The term "diesel fuel" means "distillate fuels" including diesel fuels meeting the ASTM definition for diesel fuels or others even though they are not wholly comprised of distillates and can comprise alcohols, ethers, organo-nitro compounds and the like (e.g., methanol, ethanol, diethyl ether, methyl ethyl ether, nitromethane). Also within the scope of this invention, are emulsions and liquid fuels derived from vegetable or mineral sources such as corn, alfalfa, shale, and coal. These fuels may also contain other additives known to those skilled in the art, including dyes, cetane improvers, anti-oxidants such as 2,6-di-tertiary-butyl-4-methylphenol, corrosion inhibitors, rust inhibitors such as alkylated succinic acids and anhydrides, bacteriostatic agents, gum inhibitors, metal deactivators, upper cylinder lubricants, antiicing agents and the like.

The process is effective with urea, but can utilize other solid $NO_x$-reducing reagents capable of generating a reactant gas containing ammonia upon heating. As will be clear from the following, when certain of these solid reagents are pyrolyzed, the reactant gas will also contain HNCO unless sufficient water is contacted with it to convert the HNCO to ammonia and carbon dioxide.

Among the solid $NO_x$-reducing reagents are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; cyanuric acid; isocyanic acid; melamine; tricyanourea and mixtures of any number of these. The term "urea-related $NO_x$-reducing reagent" is meant to include the solid reagents that, like urea, form HNCO when heated. Among this group are: ammelide, ammeline, ammonium cyanate, biuret, cyanuric acid, isocyanic acid, melamine, tricyanourea, urea and mixtures of any number of these. The term "urea" is meant to encompass urea in all of its commercial forms. Typically, commercial forms of urea will consist essentially of urea, containing 95% or more urea by weight.

Yet other solid $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine and hexamethylamine carbonate. Amines with higher alkyls can be employed to the extent that the hydrocarbon components released do not interfere with the $NO_x$-reduction reaction.

Aqueous solutions of urea or other reagent are not required by the invention. This has several distinct advantages, including the realization of significant savings in energy otherwise necessary to vaporize the water and the savings on the cost of antifreeze additives. Solid $NO_x$-reducing reagents are decomposed to gaseous reactants prior to introduction into the exhaust gases. This avoids the need for residence time in the exhaust gases for decomposition of the solid reagents, making the size of the equipment smaller than when reagent is injected directly into the exhaust as either a solid or solution. Importantly, the gasification of the urea or other solid $NO_x$-reducing reagent without water and before introduction into the exhaust gases, facilitates close coupling of the ammonia-generating unit and the SCR catalyst. In this regard, the introduction can be directly adjacent to the SCR reactor, or separated by only sufficient space to include mixing means.

The absence of water also eliminates the cooling effect it can have on the exhaust gases—a result not desirable for SCR. In addition, due to the manner of using the urea or other reagent, no solid reagent will contact the SCR catalyst—thus, the risk of catalyst fouling is greatly reduced. Again, close coupling is facilitated and results in reduction in the size and weight of equipment.

Figure 1:
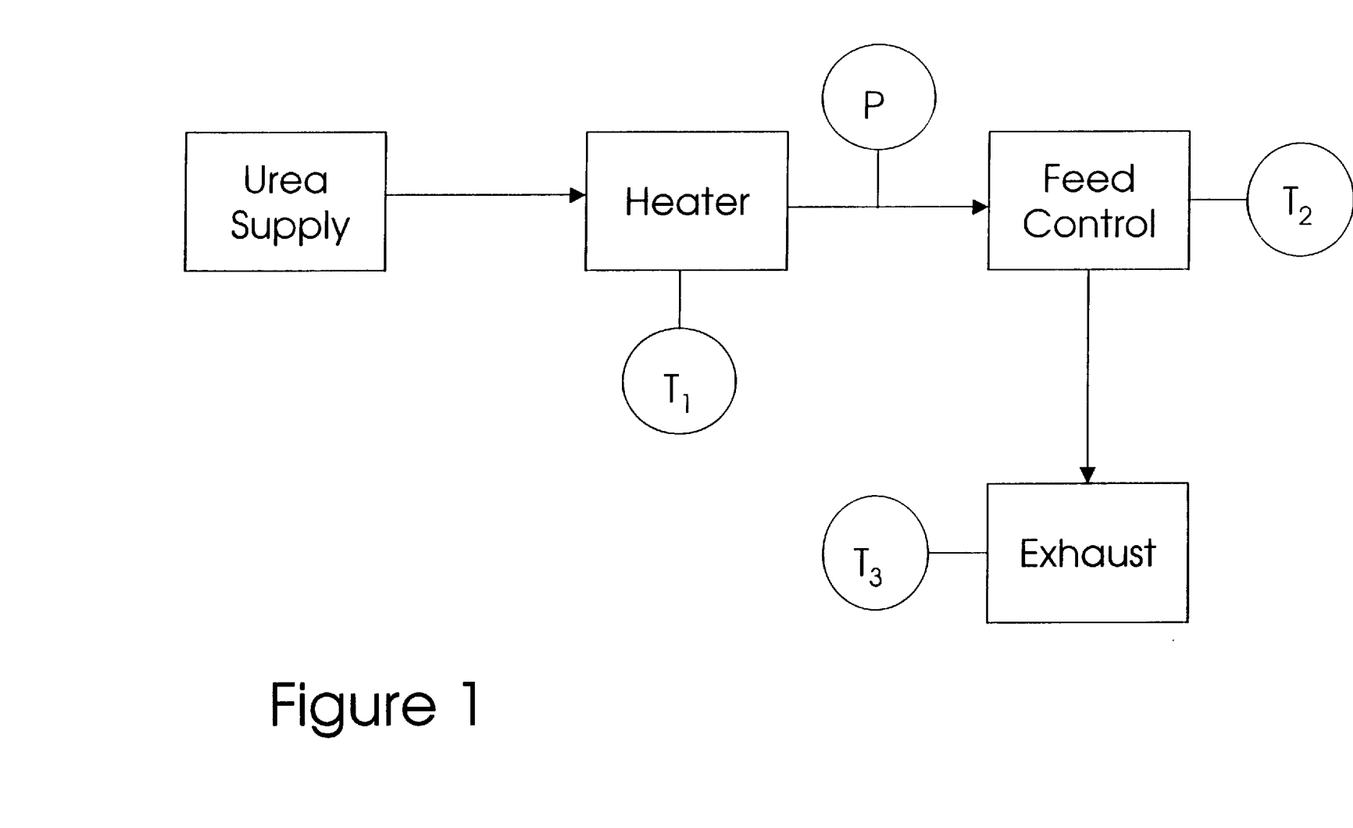
FIG. 1 is a flow diagram showing principal components of one embodiment of the invention.

Reference is made to FIG. 1, which illustrates one embodiment of the invention in block diagram form. The invention enables utilization of solid urea and solid nitrogenous $NO_x$-reducing reagents in place of ammonia for SCR $NO_x$ reduction in a manner that avoids wetting or forming solid deposits on the catalyst or forming deposits that can plug the feed system, particularly valves and injectors.

The advantages related to preventing the catalyst from being wet or having deposits form on it, are achieved by introducing the urea or other solid reagent into a heating unit to gasify it—primarily by pyrolysis. The heating chamber and the feed to it can be under any pressure that is practical. In some cases subatmospheric pressures are useful, but typically heating will be done under an elevated pressure, conveniently greater than 50 psi to assist in feeding the resulting reagent gas. The temperature, $T_1$, in the heating unit is maintained sufficiently high to assure pyrolysis.

To achieve the goal of pyrolysis for a solid "urea-related $NO_x$-reducing reagent", temperatures above about 300° C. are employed for heating. The temperature of the gases produced by pyrolizing reagents in this group should be maintained at a level that prevents their condensation. Typically, the temperature should be maintained at a temperature at least 300° C., and preferably at least 400° C. A preferred temperature range for the heating unit and for transfer of the gases produced by the noted group of reagents, is from about 450° to about 500° C. Pressure in the heating unit should be sufficient to enable uniform metering at the temperature selected, typically being within the range of from about 50 psi up to about 100 psi.

More moderate temperatures, e.g., above about 40° C., and typically from about 60° to about 300° C., can be employed to gasify the other solid $NO_x$-reducing reagents, namely: ammonium carbonate (60° C.); ammonium bicarbonate (60° C.); ammonium carbamate (60° C.); ammonium salts of inorganic acids, including sulfuric acid (280° C.) and phosphoric acid (155° C.); and ammonium salts of organic acids, including formic and acetic acid (190° C.). Because gasification of these materials does not produce HNCO (isocyanic acid, also sometimes called cyanic acid: HN=C=O), there is no need to maintain the high temperature to prevent condensation, Yet others, do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine and hexamethylamine carbonate. Amines with higher alkyls can be employed to the extent that the hydrocarbon components released do not interfere with the $NO_x$-reduction reaction.

It is possible to provide a catalyst suitable for aiding the pyrolysis of the urea. Among the suitable pyrolysis catalysts are ones that comprise a material selected from the group consisting of platinum group metals, such as palladium and platinum, stainless steel, and the oxides of vanadium, chromium, titanium, molybdenum and nickel, and mixtures of two or more of these. The pyrolysis catalyst preferably comprises one of these materials in a foraminous configuration, e.g., a form selected from the group consisting of wire mesh, sintered metal, sheet metal with mechanically formed holes, zeolite, alumina, ceramic, beads, honeycomb structures, rings and saddles. These or other materials can be impregnated or coated with catalytic material. Also see EP 615,777, which discloses a mixed oxide catalyst comprised of $Al_2O_3$—$TiO_2$—$SiO_2$—$ZrO_2$.

At the indicated temperatures and pressures, the urea or other solid urea-related $NO_x$-reducing reagent will be pyrolyzed to produce a reactant gas containing a mixture of ammonia and HNCO. It can be advantageous where the added equipment is justified economically, to employ a separate reactor wherein HNCO is reacted with water vapor (as steam or combustion gases) to convert all of the active nitrogen reagents to ammonia. Typically, this reaction will have a stoichiometry calling for one mole of water (as steam) for each mole of HNCO, and will be effective at pressures and temperature on the order of those described.

From the heating unit, the gases including ammonia are provided to a feed controller which can be a valve or injector. The valve or injector employed to feed reactant gases to the exhaust, will preferably be maintained at a temperature sufficiently low to assure reliable operation of the valve or other metering or feeding device. However, it will be necessary when using urea-related $NO_x$-reducing reagents, to maintain the temperature and/or other conditions to avoid condensation products from solidifying on surfaces. Temperatures on the order of those identified above for pyrolysis are effective to prevent this adverse result. Some distance can separate the valve or other metering device from the heat of the exhaust and the heating unit to assure reliable operation. The feed control will feed the gas as needed into the exhaust to provide sufficient ammonia for $NO_x$ reduction.

The elimination of water from reagent feed into the exhaust gases, has particular advantage because there are times during the operation of a diesel or other engine, that the exhaust temperature will be below the temperature required for operation of an SCR catalyst, e.g., 250° C. in the case of vanadia-titania catalysts, and 350° C. in the case of zeolite catalysts. Other catalysts based on platinum can be effective down to about 180° C. Volatilization of the water present would tend to further cool the exhaust. During times when the exhaust temperature is too low, SCR cannot be performed.

According to the invention, the exhaust gas temperature is not reduced by the evaporation of water, and the exhaust gas temperature is maintained at the temperatures most preferred for SCR. However, there remain times such as during start up and idling, that the temperature is not high enough. During these times, ammonia is preferably not introduced into the exhaust because it will simply pass through and foul the air. A variety of other catalysts are available and can be selected based on a particular apparatus configuration and the operating conditions that can be expected.

Figure 2:
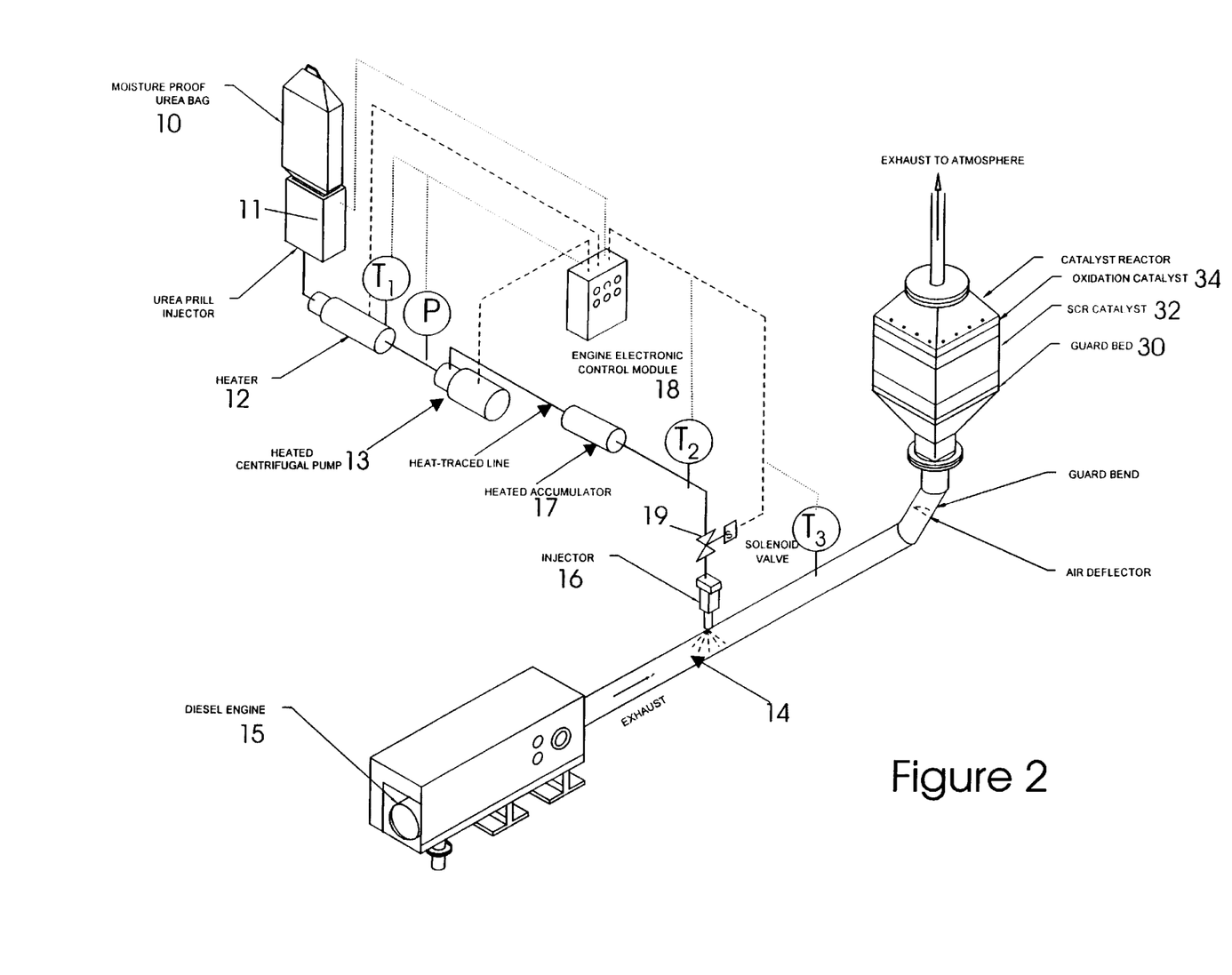
FIG. 2 is a schematic representation of one arrangement of apparatus according to the invention.
Figure 3:
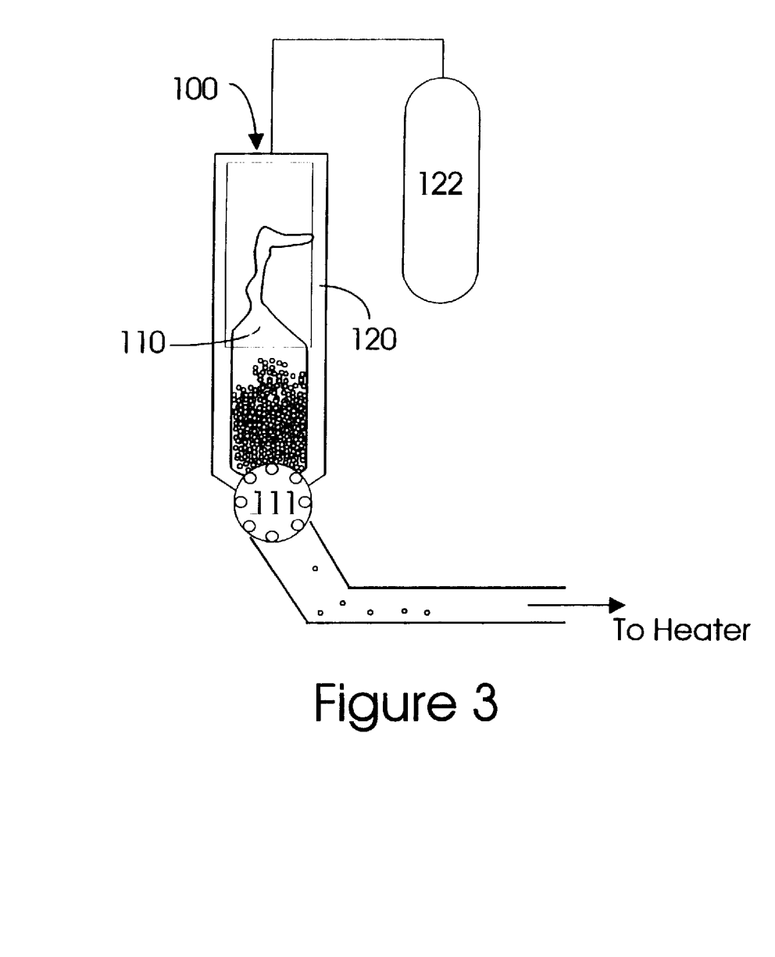
FIG. 3 shows, schematically, an alternative form of device for feeding a solid $NO_x$-reducing reagent under pressure.

FIG. 2 schematically illustrates one embodiment of an apparatus of the invention. Urea prills are fed from a bag 10 by urea prill injector 11 to chamber 12, which serves as the heating unit referred to above. It will be noticed that the bag 10 is not enclosed as bag 110 is shown in FIG. 3. In the case of FIG. 2, either atmospheric pressure or vacuum can be employed; whereas, in the embodiment illustrated in FIG. 3, elevated pressure would be employed. Therefore, in FIG. 2 a pump 13 is shown to advance the gases released in the heating chamber 12. The heating chamber 12 can be in contact with the exhaust pipe 14 of engine 15 wherein the hot exhaust gases provide heat to supply at least part of (or all of) the required heat. Alternatively, an auxiliary heater can be employed to supply a portion or all of the heat. A metering device 19 provides metered feed to an injector nozzle 16, which discharges reactant gas into the exhaust. Alternatively, injector nozzle 16 can be actuated to control flow of reactant gas. A multiplicity of nozzles may be used.

FIG. 3 shows a variation of feed equipment shown in FIG. 2. In FIG. 3, a feed hopper 100 holds a collapsible bag of urea prills 110 within a chamber 120, which is pressurized, e.g., by a gas cylinder 122. A prill injector 111 has the capability of feeding one prill (the size of the prills is exaggerated for illustration purposes) or other measured dose at a time into heater 112, which is under pressure in this embodiment. This feed equipment could replace that shown in FIG. 2, and by pressurizing the feed, the need for the pump 13 can be eliminated.

Referring again to FIG. 2, a pressure gage is noted for the purpose of sensing the pressure in heating chamber 12 following the metering device. The pressure gage P generates a signal representative of the pressure and feeds this signal to controller 18. The controller receives this signal, compares it to reference values and generates one or more control signals to regulate the operation of urea prill injector 11 and heater 12. The temperature in the exhaust gas is measured by temperature gage $T_3$. It is an advantage of the invention that the temperature of the exhaust gases must be sufficient only for SCR and not for either hydrolysis or pyrolysis of the reagent. This, and the fact that there is no water to cool the exhaust, enables operation under conditions where the prior art would require a shut down.

A small, optional surge vessel or accumulator 17 (heated in the cases where the reactant gas contains HNCO) can be provided to receive the reactant gases, including ammonia, exiting heater 12. Ammonia-containing reactant gas is then fed via valve 19 to injector nozzle 16. This nozzle can be of any suitable type, either high-pressure or low-pressure.

Figure 4:
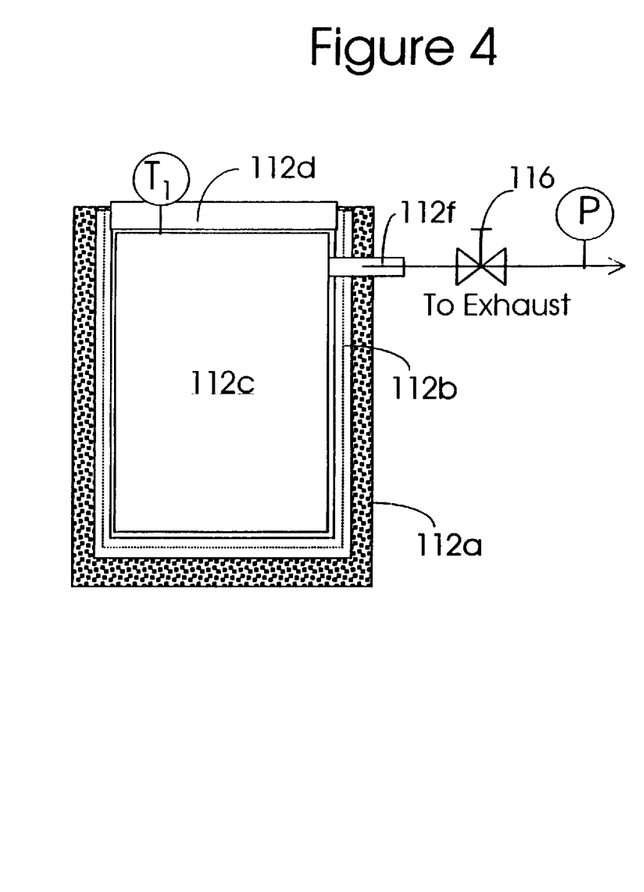
FIG. 4 is a schematic diagram of a simplified heating device for the embodiment where a solid reagent in a canister is converted to noncondensing reactant gases.

In the case of reagent solids that do not produce HNCO, a simplified heating unit of the type shown in FIG. 4 can be employed. An outer insulating layer 112a covers a heating layer 112b that receives and directly heats canister 112c, containing a suitable solid reagent that gasifies upon heating. The vessel is closed on top by lid 112d and has an outlet 112f which can supply reactant gas to the exhaust gases under the control of valve 116.

Among the effective high-pressure injectors are those employed to inject methane or propane gases into engines that run on those fuels. Among the suitable low-pressure injector nozzles are any of the available low-pressure liquid distribution means, such as a mechanical atomizer of the type employed to spray paints, a sonic atomizer, a simple valve extending to a tube with a dispersion device comprising a plurality of orifices to provide a fine spray, a pintle-controlled nozzle capable of adjustable spray patterns, or the like. Air-powered nozzles can be employed, but it is preferred to operate them with a minimum of air to reduce the cost of the equipment and the effect air has on cooling the exhaust. In circumstances where neither air supply nor its cooling effect pose unacceptable design compromises, air can be employed to cool the injector and/or aid injection of reactant gas.

Optionally, a static mixer 30 (or an uncotalyzed support or a diesel particulate trap) can be positioned between the gasification chamber and the $NO_x$-reduction catalyst in chamber 32. It is, however, an advantage of the invention that the thorough gasification of the reagent permits close coupling of the injectors and the catalyst, It is also an advantage of the invention that engine designers can focus on fuel economy and low particulate emissions while relying on the SCR of the invention to control $NO_x$. Optionally, an oxidation catalyst 34 can be provided to strip any residual ammonia or HNCO from the exhaust gases.

FIG. 2 illustrates a control system of a type useful to maintain the proper level of reagent introduction (i.e., dosage). The controller 18 controls the flow of reagent into the exhaust by sending a control signal to valve 19 or injector nozzle 16. Heating unit 12 for gasifying the urea or other reagent can be run constantly or on command upon a signal generated by the controller 18 monitoring one or more engine, exhaust and/or reagent parameters. The temperature of the exhaust ($T_3$) is one parameter of importance. The ammonia-containing gas should not be introduced into exhaust that is too cool for effective SCR or which would cause the reactant gas to condense.

The controller receives the signal representative of pressure and/or other measured parameters (e.g., $T_1$, $T_2$ and $T_3$) and generates one or more control signals to regulate the heater 12 and/or the regulator valve 19 or injector nozzle 16. The solid reagent can be fed into the heater and the ammonia-containing gas reagent can be fed into the exhaust, independently in response to a feed-forward controller in response to control signals generated by the controller by any of a number of measured parameters to reference values. Among these measured parameters are: fuel flow, throttle setting, engine speed, rack setting, intake air temperature, barometric pressure, intake air humidity, exhaust gas temperature and/or other parameters effective for particular engines. In addition, to the extent that sensors are available, trim or feed back control can be provided based on residual gas species following the catalyst, e.g., the level of $NO_x$, HC or CO. If desired, feedback control can be employed to trim the system in response to residual levels of ammonia, other gas species, or any other measurable engine or exhaust gas property.

It is an advantage of the invention that the introduction of the reagent in gaseous form (i.e., the reactant gas, not the solid reagent) provides an ability to closely control reagent dosing. It is also an advantage that the transient engine conditions or discontinuities in $NO_x$ levels can be better tracked with injection of reagent in the proper amounts. It is another advantage of the invention that the temperature of the reactant gas can be controlled to prevent line or injector plugging due to solid or molten decomposition products forming. It is a further advantage of this aspect of the invention that the reactant gas containing ammonia can be injected into the exhaust gases at a temperature and pressure to assure effective SCR, without the need to store ammonia on board a vehicle.

The active reactant gas species formed by the pyrolysis and gasification of the urea or other solid reagent are introduced into the exhaust gases in an amount sufficient to provide the degree of $NO_x$ reduction desired. The desired amount can be dictated by regulation, engine design requirements or other criteria. Typically, a molar ratio of the active species to the baseline nitrogen oxides level (by which is meant the pre-treatment level of $NO_x$ in the effluent) of at least about 0.3:1 will be employed. More narrowly, the reagent is supplied to provide a molar ratio of active species to baseline nitrogen oxides of about 0.5.1 to about 1:1. The reagent levels or target $NO_x$ concentrations in the exhaust can be preprogrammed into the controller based on tested values for given fuel flows and related parameters, or sensors and related controls can be provided to provide real-time readouts. A sensor means might be provided to correct preprogrammed values by feedback control.

The SCR catalyst used is one capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other artknown supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato et al. in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220° to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori et al. in U.S. Pat. No. 4,107,272 discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing the reactant gas is most preferably passed over the SCR catalyst while the effluent is at a temperature between about 180° C. and about 650° C., preferably at least 250° C. In this manner, the active species present in the effluent due to pyrolysis and gasification of the reagent solution most effectively facilitates the catalytic reduction of nitrogen oxides. The effluent will preferably contain an excess of oxygen. Use of the present invention with any of the above SCR catalysts (the disclosure of which are specifically incorporated by reference) reduces or eliminates the requirement for the transport, storage and handling of large amounts of ammonia or ammonium water.

Because the invention is compatible with other emission-reducing and fuel economy technologies, a number of hybrid processes become available to the engine designer, vehicle producer and retrofit market, For example, the fuel can be catalyzed with a suitable platinum group metal additive and/or auxiliary catalyst composition selected from the group consisting of compounds of sodium, lithium, potassium, calcium, magnesium, cerium, iron, copper, manganese, and mixtures. Among the compounds are any of those disclosed for example in prior U.S. Pat. Nos. 4,892,562 and 4,891,050 to Bowers and Sprague, 5,034,020 to Epperly and Sprague, 5,215,652 to Epperly, Sprague, Kelso and Bowers, and 5,266,083 to Peter-Hoblyn, Epperly, Kelso and Sprague, WO 90/07561 to Epperly, Sprague, Kelso and Bowers, and U.S. patent application Ser. No. 08/597,517 filed Jan. 31, 1996, by Peter-Hoblyn, Valentine and Sprague, hereby incorporated by reference. Where the application permits, a blend of these compounds can be used with one or more other platinum group metal compounds such as soaps, acetyl acetonates, alcoholates, β-diketonates, and sulfonates, e.g., of the type which will be described in more detail below.

The platinum group metal catalyst and/or other catalyst can be added in any manner effective for its intended purpose, such as by adding it to the fuel in bulk storage, to the fuel in a tank associated with the engine, or by continuous or intermittent addition, such as by a suitable metering device, into: the fuel line leading to the engine, or in the form of a vapor, gas or aerosol into the air intake, the exhaust gases before the trap, exhaust gases after the trap but before recirculation to the engine, or a mixing chamber or equivalent means wherein the exhaust gases are mixed with incoming air.

When employed, particularly in combination with particulate traps, platinum group metal catalyst compositions are preferably employed at concentrations of less than 2 parts by weight of platinum group metal per million parts by volume fuel (ppm). For the purposes of this description, all "parts per million" figures are on a weight to volume basis, i.e., grams/million cubic centimeters (which can also be expressed as milligrams/liter), and percentages are given by weight, unless otherwise indicated. Auxiliary catalysts are employed at levels effective for their intended purpose, preferably at levels of from 1 to 100 ppm of the fuel utilized, e.g., 10 to 60 ppm.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

We claim:

1. A method for reducing the emissions of $NO_x$ from a lean-burn engine having associated therewith an exhaust system having an exhaust passage leading to an SCR reactor effective for selective catalytic $NO_x$ reduction, comprising:

supplying solid $NO_x$-reducing reagent capable of generating ammonia-containing reactant gas upon heating, into a vessel having an outlet;

heating the solid $NO_x$-reducing reagent in the vessel at a temperature above the pyrolysis temperature for the reagent, to produce a reactant gas containing ammonia;

introducing the reactant gas into the exhaust gas at an exhaust gas temperature effective for selective catalytic reduction; and passing the exhaust gas containing the reactant gas through an SCR reactor.

2. A method according to claim 1 wherein the temperature of the exhaust gases is within the range of from about 180° to about 650° C.

3. A method according to claim 1 wherein the solid $NO_x$-reducing reagent comprises a member selected from the group consisting of include ammelide, ammeline, ammonium cyanate, biuret, cyanuric acid, isocyanic acid, melamine, tricyanourea, urea, and mixtures of any number of these; and is heated to a temperature of at least about 300° C.

4. A method according to claim 3 wherein the reactant gas is maintained at elevated temperature until introduced into the exhaust gas.

5. A method according to claim 3 wherein the solid $NO_x$-reducing reagent is heated to a temperature of at least about 400° C.

6. A method according to claim 1 wherein the solid $NO_x$-reducing reagent is maintained under a pressure of at least about 50 psi during heating.

7. A method according to claim 1 wherein the solid $NO_x$-reducing reagent is heated at least in part with heat from the exhaust.

8. A method according to claim 1 wherein the solid $NO_x$-reducing reagent is heated at least in part with heat from an auxiliary heater.

9. A method according to claim 1 wherein the solid $NO_x$-reducing reagent comprises a member selected from the group consisting of ammonium carbonate; ammonium bicarbonate; ammonium carbamate; ammonium salts of inorganic acids, including sulfuric acid and phosphoric acid; ammonium salts of organic acids, including formic and acetic acid; and mixture of two or more of these; and is heated to a temperature of from about 40° to about 150° C.

10. A method according to claim 1 or 9 wherein the temperature of the reactant gas is not maintained after it is formed by pyrolysis.

11. A method according to claim 1 or 9 wherein the reactant is introduced into the exhaust between exhaust valves of the engine and a turbocharger exhaust turbine.

12. A method according to claim 1 or 9 wherein the reactant gas is introduced into the exhaust in close-coupled relation with the SCR catalyst.

13. An apparatus for reducing the emissions of $NO_x$ from a lean-burn engine having associated therewith an exhaust system having an exhaust passage leading to an SCR reactor effective for selective catalytic $NO_x$ reduction, comprising:

means for supplying solid $NO_x$-reducing reagent to a vessel having an outlet;

means for heating the solid $NO_x$-reducing reagent in the vessel at a temperature above the pyrolysis temperature for the reagent, to produce a reactant gas containing ammonia;

means for introducing the reactant gas into the exhaust gas at an exhaust gas temperature effective for selective catalytic reduction; and means for passing the exhaust gas containing the reactant gas through an SCR reactor.

14. An apparatus according to claim 13, further including:

means for maintaining the solid $NO_x$-reducing reagent under pressure while it is being supplied to the vessel; and means for maintaining the reactant gas under pressure in the vessel.

15. An apparatus according to claim 13, further including:
  means to sense the temperature with the exhaust gas;
  means to generate a signal representative of the sensed temperature;
  means to sense the pressure of reactant gas;
  means to generate a signal representative of the sensed pressure; and
  means to compare the generated signals to referenced values and generate a control signal for controlling solid $NO_x$-reducing reagent feed to the means for heating the solid $NO_x$-reducing reagent and the feed of reactant gas to the exhaust gases.

16. An apparatus according to claim 13, further including:
  means to feed the solid reagent under pressure.

* * * * *